(12) United States Patent
Nagatomi et al.

(10) Patent No.: US 7,558,184 B2
(45) Date of Patent: Jul. 7, 2009

(54) OPTICAL PICKUP DEVICE

(75) Inventors: Kenji Nagatomi, Gifu (JP); Seiji Kajiyama, Gifu (JP); Tetsuhisa Hosokawa, Yokohama (JP)

(73) Assignee: Sanyo Electric Co., Ltd., Osaka (JP)

( * ) Notice: Subject to any disclaimer, the term of this patent is extended or adjusted under 35 U.S.C. 154(b) by 679 days.

(21) Appl. No.: 11/218,783

(22) Filed: Sep. 6, 2005

(65) Prior Publication Data
US 2006/0083147 A1 Apr. 20, 2006

(30) Foreign Application Priority Data
Oct. 19, 2004 (JP) .............................. 2004-303989

(51) Int. Cl.
*G11B 7/00* (2006.01)
(52) U.S. Cl. ..................... 369/121; 369/112.03
(58) Field of Classification Search .................. None
See application file for complete search history.

(56) References Cited

U.S. PATENT DOCUMENTS

| 6,834,036 | B1 * | 12/2004 | Shiono et al. | 369/112.03 |
| 7,301,881 | B2 * | 11/2007 | Itonaga | 369/112.23 |
| 2003/0151996 | A1 * | 8/2003 | Hendriks et al. | 369/53.2 |
| 2003/0227859 | A1 * | 12/2003 | Hirai | 369/112.12 |
| 2004/0125737 | A1 * | 7/2004 | Iwata et al. | 369/121 |

FOREIGN PATENT DOCUMENTS

| JP | 06-131688 | 5/1994 |
| JP | 11134702 A * | 5/1999 |
| JP | 2004022717 A * | 1/2004 |

OTHER PUBLICATIONS

Chinese Office Action, with English translation, issued in Chinese Patent Application No. CN 200510114039.7, mailed Dec. 22, 2006.
Second Chinese Office Action issued in Chinese Patent Application No. 200510114039.7 dated on Jun. 22, 2007.

* cited by examiner

*Primary Examiner*—Wayne R Young
*Assistant Examiner*—Adam R Giesy
(74) *Attorney, Agent, or Firm*—McDermott Will & Emery LLP

(57) ABSTRACT

Provided is an optical pickup device capable to suppress an occurrence of an aberration on a recording medium and a decrease of power of laser beams while employing a diffraction grating as an optical axis correction element.

The laser element emitting the laser beam for CD (780 nm in wavelength) is disposed between the laser element emitting the laser beam for next-generation DVD (405 nm in wavelength) and the laser element emitting the laser beam for DVD (650 nm in wavelength). Only the laser beam for DVD is aligned by a diffraction effect of the optical axis correction element (diffraction grating) with the optical axis of the laser beam for next generation DVD. It is possible that a decrease of laser power due to diffraction efficiency is suppressed as much as possible because only the optical axis of the laser beam for DVD is aligned with the optical axis of the laser beam for next-generation DVD. Also it is possible that the optical axis of the laser beam for CD not subjected to the optical axis correction is brought close to the optical axis of laser beam for next-generation DVD considerably, thereby an aberration occurring in the laser beam for CD can be suppressed at minimum level.

8 Claims, 10 Drawing Sheets

DIFFRACTION ORDER AND DIFFRACTION EFFICIENCY

| | 405nm | 650nm | 780nm |
|---|---|---|---|
| DIFFRACTION ORDER | 0 | +1 | 0 |
| DIFFRACTION EFFICIENCY | 96 | 80 | 98 |

FIG.4C

DESIGNED VALUES OF OPTICAL AXIS CORRECTION ELEMENT (1) STEP HIGHT: H=1.57 $\mu$M
(2) REFRACTION INDEX
 · WAVELENGTH 405 nm : n = 1.53
 · WAVELENGTH 650 nm : n = 1.52
 · WAVELENGTH 780 nm : n = 1.51

FIG.4A

FOUR-STEP GRATING PATTERN

LASER ELEMENT ARRANGEMENT VIEWED FROM SIDE OF LASER EMISSION POINT

FIG. 9A

LASER ELEMENT ARRANGEMENT VIEWED FROM SIDE OF SEMICONDUCTOR LASER

FIG.10

VALUES STANDARDIZED ON DVD

| | | CD | DVD |
|---|---|---|---|
| WAVE LENGTH (nm) | | 1.19 | 1.00 |
| NUMERAL APERTURE | | 0.78 | 1.00 |
| SUBSTRATE THICKNESS | | 2.00 | 1.00 |
| COMA ABERRATION | $\propto t*NA^3/\lambda$ | 0.81 | 1.00 |
| SPHERICAL ABERRATION | $\propto t*NA^4/\lambda$ | 0.64 | 1.00 |

OPTICAL PICKUP DEVICE

BACKGROUND OF THE INVENTION

1. Field of the Invention

The present invention relates to an optical pickup device, and more particularly to an optical pickup device suitable for a compatible optical pickup device for emitting several kinds of laser beams having different wavelengths to a recording medium.

2. Description of the Related Art

Currently, various optical discs such as a compact disc (CD) and a digital versatile disc (DVD) have been commercialized and widely used. Further, recently, next-generation DVD standardization for recording and reproducing information using a blue-violet laser beam has been proceeded with. In the next-generation DVD, information is recorded and reproduced using the blue-violet laser beam having a wavelength of about 405 nm. When the wavelength of the laser beam shortens, a higher density can be obtained.

Therefore, when the variety of optical discs increases, development of a so-called compatible optical pickup device capable of performing recording and reproduction on different kinds of optical discs is desired. In order to irradiate an optical disc with laser beams having different wavelengths, it is possible to employ an arrangement in which semiconductor lasers that emit laser beams having different wavelengths are separately disposed. However, when such arrangement is employed, spaces for separately disposing the semiconductor lasers and optical elements for guiding the laser beams to an objective lens are required. Consequently, the external dimensions become large and the number of parts increases.

Thus, an arrangement in which a plurality of laser elements having different emitting wavelengths are provided all together in a single CAN package has been studied. According to such arrangement, a space for disposing the semiconductor lasers can be reduced and an optical system can be commonly used among the laser beams.

However, when the plurality of laser elements are provided in the single CAN package as described above, a deviation in a direction perpendicular to the optical axis occurs between the optical axes of the laser beams according to arrangement gap between the respective laser elements. In this case, when the optical axis of the optical system is aligned with the optical axis of a laser beam, the optical axes of other laser beams deviate from the optical axis of the optical system. Consequently, in the case of recording and reproduction using the other laser beams, there arises a problem in that aberration of laser beams is produced on a recording medium to cause deterioration of optical characteristics.

Therefore, according to JP 06-131688 A, a birefringence element is disposed immediately after a semiconductor laser including several kinds of laser elements, and the optical axes of the laser beams are aligned with one another by the birefringence element to guide the laser beams to the optical system.

However, this conventional art requires an additional birefringence element. In addition, it is necessary to form the laser elements such that the polarization plane of the reference laser beam is orthogonal to the polarization plane of each of the other laser beams. However, it is hard to form laser elements in which polarization planes of laser beams are made different from one another. Also, since the birefringence element is expensive, a problem occurs in that a cost of the optical pickup device as a whole increases.

To solve these problems, applicant has filed JP 2004-145169 A. In this application, a technique for optical axis correction using a diffraction grating is proposed. According to this technique, it is possible to suppress an increase in cost of optical pickup device because of using a diffraction grating. Also, it is not need to adjust the process to form laser elements while considering the state of the polarization plane of each laser beams having different kinds of wavelength.

However, when the optical axis correction is performed by using the diffraction grating as described above, there arises a problem in that power of laser beams decrease because of diffraction efficiency of the diffraction grating with respect to for each wavelength.

For example, in case that the optical pickup device is a compatible device for CD/DVD/next-generation-DVD, when the optical axes of the infrared laser beam (for CD) and the red laser beam (for DVD) are aligned with the optical axis of the blue-violet laser beam (for next generation-DVD) by using the diffraction grating, not only the power of the infrared laser beam but also the power of the red laser beam decrease in the optical axis correction for the infrared laser beam, still, not only the power of the red laser beam but also the power of the infrared laser beam decrease in the optical axis correction for the red laser beam. Thus, the total decrease power of these laser beams in the optical axis correction for these laser beams get to quite large amount.

SUMMARY OF THE INVENTION

An object of the present invention is to provide an optical pickup device capable to suppress an occurrence of an aberration on a recording medium and a decrease of power of laser beams while employing a diffraction grating as an optical axis correction element.

To achieve the object, an optical pickup device according to a first aspect of the present invention includes:

a semiconductor laser that houses three emission elements, respectively emitting reference, first, and second laser beams having different emission wavelengths and optical axes, in a single package; and a diffraction grating for matching, by a diffraction effect, the optical axis of the first laser beam with the optical axis of the reference laser beam, wherein a numerical aperture of the first laser beam incident on an objective lens is greater than a numerical aperture of the second laser beam on the objective lens, and the diffraction grating is disposed in an optical path between the semiconductor laser and the objective lens.

An optical pickup device according to a second aspect of the present invention includes:

a semiconductor laser that houses three emission elements, respectively emitting reference, first, and second laser beams having different emission wavelengths and optical axes, in a single package; and a diffraction grating for matching, by a diffraction effect, the optical axis of the first laser beam with the optical axis of the reference laser beam, wherein the wavelength of the first laser beam is shorter than the wavelength of the second laser beam, and the diffraction grating is disposed in an optical path between the semiconductor laser and an objective lens.

According to the first aspect and the second aspect of the present invention, only one of two optical axes of laser beams other than a reference laser beam is subject to the optical axis correction. Thus, the decrease of laser power due to diffraction efficiency occurs only one time by only one diffraction grating. Therefore, it is possible to suppress the decrease of power with respect to the each laser beam having respective wavelength in comparison with the case where two optical axes of laser beams other than a reference laser beam are subject to the optical axis correction.

In this case, when the optical axis correction is conducted with respect to the laser beam incident on the objective lens with a higher numeral aperture between the two laser beams other than the reference laser beam as described in the first aspect of the present invention, an occurrence of an aberration on a recording medium can be suppressed effectively as described below.

Figure 10:
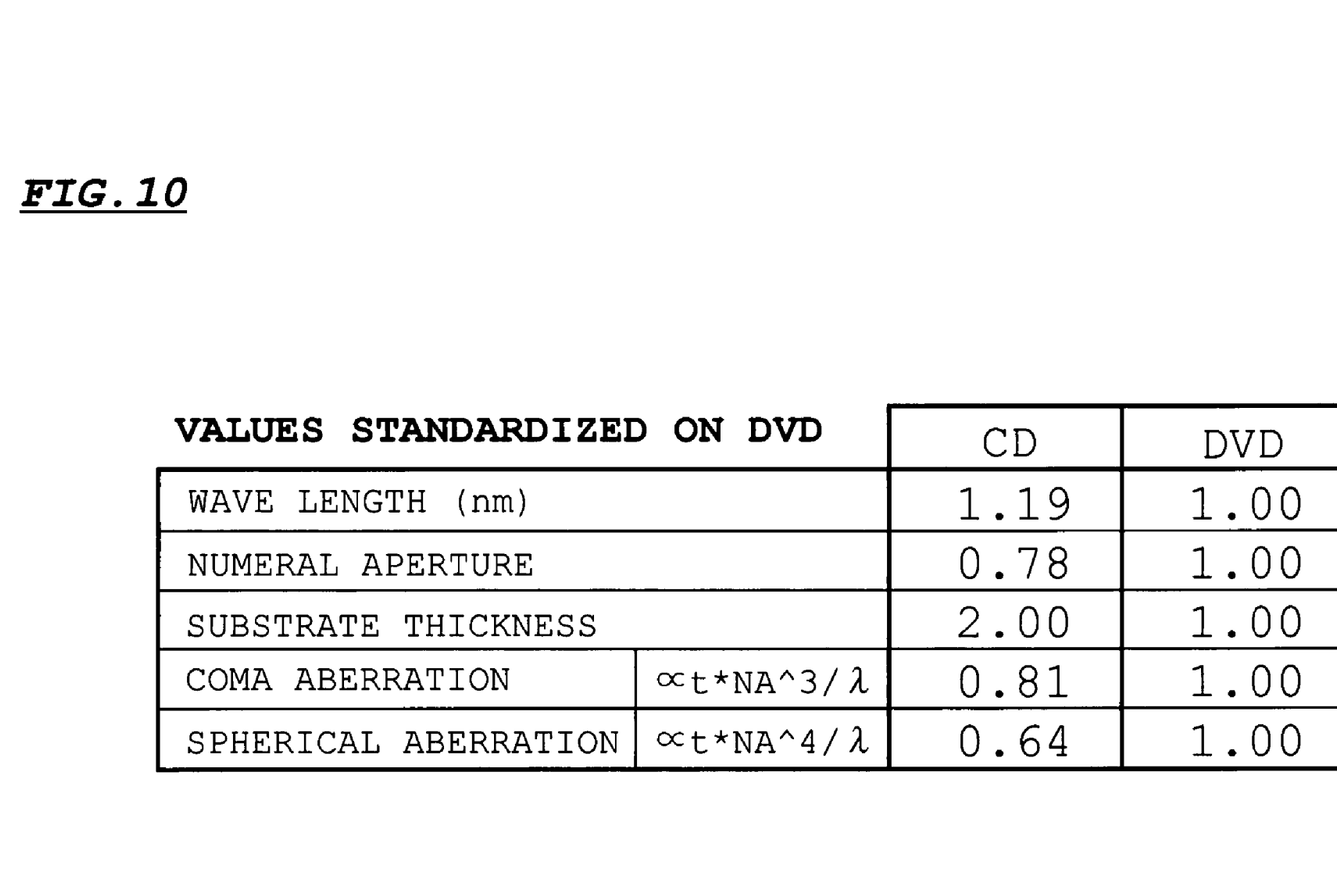
FIG. 10 is an example showing an amount of aberration in using a laser beam for CD and a laser beam for DVD.

That is, as shown in FIG. 10, the amount of aberration (coma aberration, spherical aberration) of laser beams on the disc is expressed by the following expression.

Coma aberration $\propto t \times NA^3 / \lambda$

Spherical aberration $\propto t \times NA^4 / \lambda$

That is, the amount of a comma aberration is directly proportional to a substrate thickness of disc and the cube of a numerical aperture (NA) of the laser beam incident on the objective lens, and inversely proportional to a wavelength of the laser beam. Also, the amount of a spherical aberration is directly proportional to a substrate thickness of disc and the fourth power of a numerical aperture (NA) of the laser beam incident on the objective lens, and inversely proportional to a wavelength of the laser beam. Thus, the aberration occurring in the laser beam incident on the objective lens with a higher numeral aperture is greater than the aberration occurring in the laser beam incident on the objective lens with a lower numeral aperture. Therefore, when the optical axis correction is conducted with respect not to the laser beam incident on the objective lens with a lower numeral aperture but to the laser beam incident on the objective lens with a higher numeral aperture as described in the first aspect of the present invention, an occurrence of an aberration can be suppressed effectively.

Also, when the optical axis correction is conducted with respect not to the laser beam having a longer wavelength but to the laser beam having a shorter wavelength as described in the second aspect of the present invention, an occurrence of an aberration can be suppressed effectively because of expressions of a comma aberration and a spherical aberration shown in FIG. 10.

That is, an amount of an aberration is inversely proportional to a wavelength of the laser beam. Thus, when the optical axis correction is conducted with respect not to the laser beam having a longer wavelength but to the laser beam having a shorter wavelength as described in the second aspect of the present invention, an occurrence of an aberration can be suppressed effectively. Especially when the difference between numerical apertures of two of the laser beams other than the reference laser beam incident on the objective lens is not exist or is trivial, by applying the second aspect of present invention to optical pickup device, an occurrence of an aberration can be suppressed effectively.

It is noted that, in the optical pickup device according to the first and second aspects of the present invention, it is preferable that the three emission elements are housed in the package such that a distance between the emission element emitting the laser beam subjected to optical axis correction and the emission element emitting the reference laser beam at a direction perpendicular to the optical axis of the reference laser beam is greater than a distance between the emission element emitting the remaining laser beam and the emission element emitting the reference laser beam at a direction perpendicular to the optical axis of the reference laser beam.

More specially, it is preferable that the three emission elements are arranged as separating each other at one direction and are housed in the package such that the emission element emitting the remaining laser beam is disposed between the emission element emitting the laser beam subjected to optical axis correction and the emission element emitting the reference laser beam.

According to this, it is possible that the laser beam not subjected to an optical axis correction between the two laser beams other than the reference laser beam can be brought close to the optical axis of the reference laser beam, thereby an amount of aberration occurring in the laser beam not subjected to an optical axis correction can be suppressed at small level.

It is noted that, in case where the optical pickup device is a compatible pickup device for CD/DVD/next-generation-DVD, the emission element emitting the reference laser beam may emit a blue-violet laser beam for next-generation DVD, the emission element emitting the laser beam subjected to optical axis correction may emit a red laser beam for DVD and the emission element emitting the remaining laser beam may emit a infrared laser beam for CD. According to this, it is possible that an occurrence of aberration in the infrared laser beam is suppressed at small level while an occurrence of aberration in the red laser beam is avoided, and a decrease of power of the blue laser beam due to the diffraction grating is suppressed.

BRIEF DESCRIPTION OF THE DRAWINGS

The above-mentioned and other objects of the present invention and the novel features thereof will be completely clearer when the following description of the embodiment is read with reference to the accompanying drawings, in which.

DETAILED DESCRIPTION OF THE PREFERRED EMBODIMENT

Figure 1:
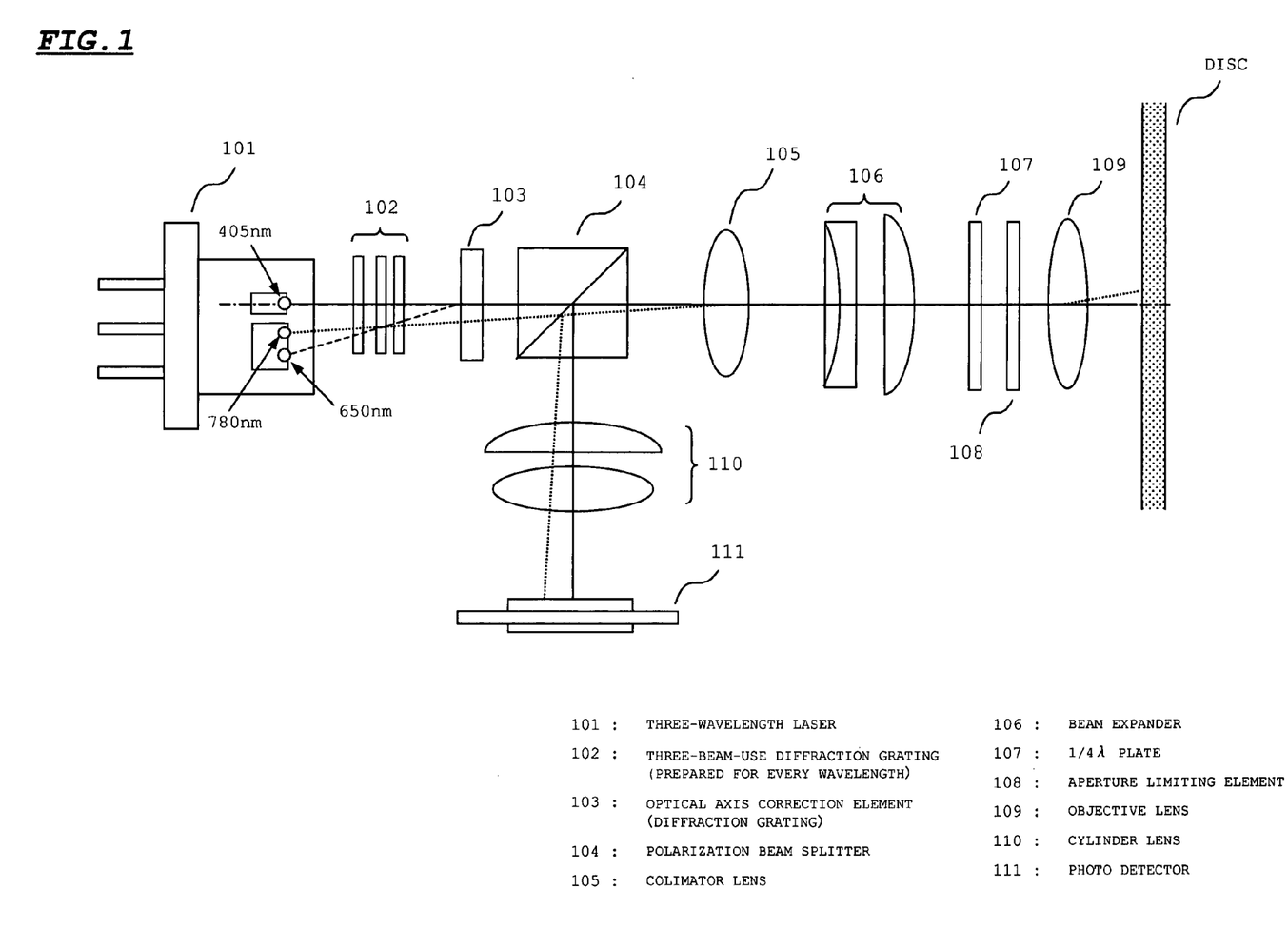
FIG. 1 shows a structure of an optical pickup device according to an embodiment of the present invention.

FIG. 1 shows a structure of an optical pickup device according to an embodiment of the present invention. The optical pickup device is used as a compatible pickup device for CD/DVD/next-generation-DVD.

The optical pickup device includes a three-wavelength laser 101, a three-beam-use diffraction grating 102, a optical axis correction element (diffracting grating) 103, a polarization BS (beam splitter) 104, a collimator lens 105, a beam expander 106, a λ/4 plate 107, a wavelength selective type aperture limiting element 108, an objective lens 109, a cylinder lens 110, a photo detector 111.

The three-wavelength laser 101 has three laser elements that emit a laser beam for CD (780 nm in wavelength), a laser beam for DVD (650 nm in wavelength), and a laser beam for next-generation DVD (405 nm in wavelength), respectively, which are housed in the same CAN package. The respective laser elements are aligned on a straight line at predetermined gaps. Polarization planes of the laser beams emitted from the respective laser elements are parallel to one another. The arrangement of the respective laser element will be described later.

Figure 5A:
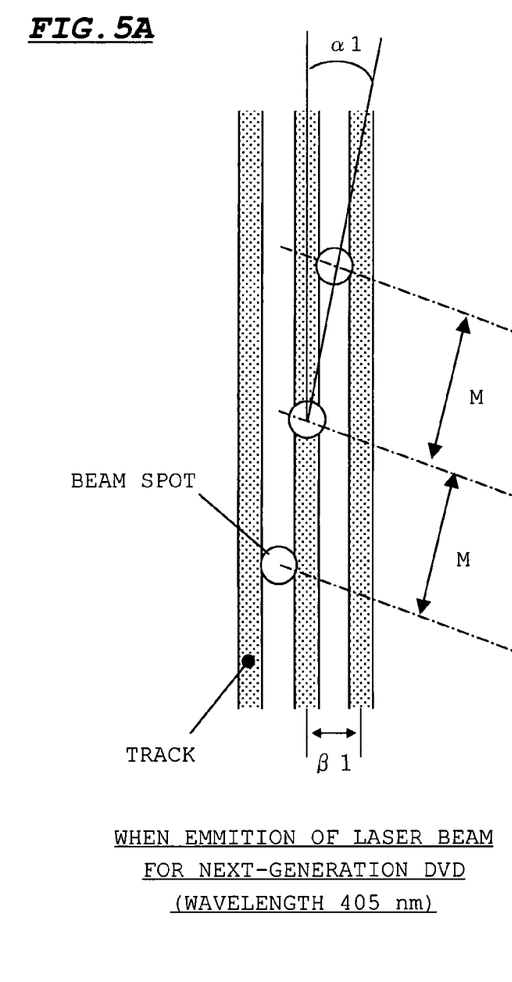
FIGS. 5A and 5B show a relation between beam spots and tracks on a disc according to the embodiment.
Figure 5B:
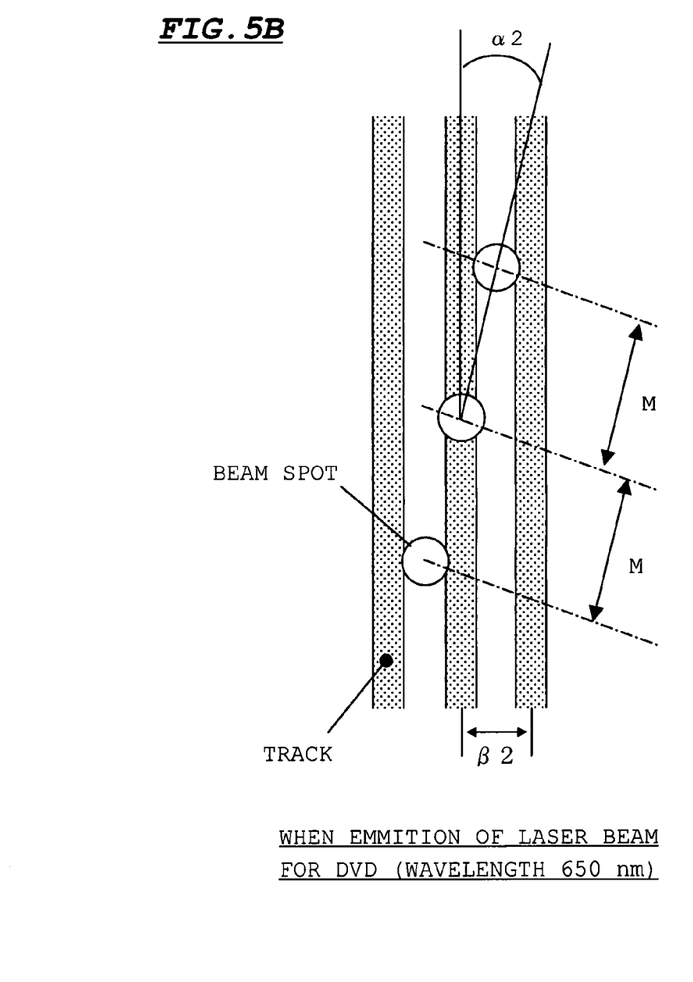

The three-beam-use diffraction grating 102 is composed by three wavelength selective type diffraction gratings. Each of the three diffraction gratings divides corresponding laser beam having respective wavelength to three beams of zero-order diffraction light, positive first-order diffraction light and negative first-order diffraction light. These respective diffraction gratings are disposed such that beam spots of positive first-order diffraction light and negative first-order diffraction light are respectively put on positions apart from the center of a track with a distance of half track pitch at a radius direction of the disc (at a center of the region between two adjacent tracks at the radius direction) when a beam spot of a zero-order diffraction light is put on the center of the track at the radius direction. Also, the diffraction grating for the laser beam for DVD (650 nm in wavelength) and the diffraction grating for the laser beam for next-generation DVD (405 nm in wavelength) are respectively adjusted with respect to the grating pitches thereof and inclination angular $\alpha 1$ and $\alpha 2$ to the track such that a distance between a beam spot of a zero-order diffraction light and beam spots of positive and negative first-order diffraction light in the case when the laser beam for DVD is radiated is the same as a distance between these beam spots in the case when the laser beam for next-generation DVD is radiated (distance M) as shown in FIGS. 5A and 5B.

The optical axis correction element 103 aligns the optical axis of the laser beam for DVD, among the laser beams emitted from the three-wavelength laser 101, with the optical axis of the laser beam for next-generation DVD by the diffracting action. That is, a pattern designed to be capable of correcting a deviation in optical axis of the laser beam for DVD is formed in the optical axis correction element 103. A structure of the diffraction grating and optical axis deviation correcting action thereof will be described later.

The polarization BS 104 is substantially completely transmitted by the laser beams emitted from the three-wavelength laser 101 and substantially completely reflects the laser beam from the disc 100.

The collimator lens 105 converts each of the incident laser beams having the different wavelengths from the polarization BS 104 into a parallel light beam. For example, the collimator lens 105 is formed by bonding a plurality of lenses whose Abbe numbers and curvatures (spherical surfaces) are adjusted such that an achromatic effect can be realized for each of the laser beams having the different wavelengths.

The beam expander 106 is composed by a concave lens, convex lens and an actuator to change the distance between these lenses. The beam expander corrects a wavefront state of a laser beam through changing the distance between the concave lens and convex lens in accordance with a servo signal from the servo circuit (not shown in the FIG. 1). For example, when the objective lens 109 is designed so as to become a finite system for only a laser beam having a predetermined wavelength, it is necessary to correct a wavefront state of the laser beam having the predetermined wavelength based on the design. In this case, the beam expander 106 provides wavefront correcting action to the laser beam having the predetermined wavelength such that the wavefront state of the laser beam becomes an adequate state.

In this embodiment, the objective lens 109 is designed so as to become an infinite system for the laser beam for DVD (650 nm in wavelength) and the laser beam for next-generation DVD (405 nm in wavelength) and to become a finite system for the laser beam for CD (780 nm in wavelength). Thus, only when the laser beam for CD is used, the beam expander 106 is driven to correct the wavefront state of the laser beam for CD to a wavefront state that fits to the specification of the objective lens 109.

The λ/4 plate 107 converts each of the laser beams that have been converted to parallel light beams through the collimator lens 105 (linearly polarized light beam) into a circularly polarized light beam. In addition, the λ/4 plate 107 converts a laser beam reflected from the disc (circularly polarized light beam) into a linearly polarized light beam having a polarization direction orthogonal to that of a laser beam incident thereon from the side of the beam expander 106. Therefore, the laser beam reflected from the disc is substantially completely reflected by the polarization BS 104.

The aperture limiting element 108 cuts off the circumference of the laser beam according to a substrate thickness of a disc. Therefore, the numerical aperture (NA) of each of the laser beams incident on the objective lens 109 is adjusted. That is, the numerical aperture of the objective lens 109 is determined in advance for each of the laser beams based on the substrate thickness of a disc. Thus, when the aperture limiting element 108 cuts off the circumferential portion of the laser beam such that the numerical aperture corresponding to the substrate thickness of the disc is obtained, each of the laser beams is allowed to enter the objective lens 109 at an appropriate, effective diameter.

When the optical pickup device is a compatible device for CD/DVD/next-generation-DVD (0.6 mm in substrate thickness), only a substrate thickness of a CD (1.2 mm) is larger than those of the other discs. Therefore, only the NA of the laser beam for CD is set to a value smaller than that of each of the other laser beams based on the substrate thickness. The aperture limiting element 108 cuts off the circumferential portion of only the laser beam for CD to adjust the effective diameter of the laser beam for CD incident on the objective lens 109, thereby adjusting the numerical aperture of the laser beam for CD to a designed value.

For example, a diffraction grating can be used as the aperture limiting element 108. A wavelength selective diffraction pattern is formed in the diffraction grating at an incident position of the circumferential portion of the laser beam. The circumferential portion of the laser beam having the corresponding wavelength is diverged by the diffraction action of the pattern. In this embodiment, a diffraction pattern for diffracting only the laser beam for CD (780 nm in wavelength) is formed at the incident position of the circumferential portion. As a result, the circumferential portion of the laser beam for CD is diverged by the diffraction to guide only the central portion thereof in the objective lens 109 direction. Alternatively, a polarization type filter can be used as the aperture limiting element 108.

The objective lens 109 is designed so as to adequately converge each of the laser beams having the different wavelengths on a recording layer. The objective lens 109 is driven at the focusing direction and tracking direction by an objective lens actuator (not shown in FIG. 1). That is, the objective lens actuator drives the objective lens 109 at the focusing direction and tracking direction in response to servo signals (tracking servo signal and focus servo signal) from the servo circuit. The description of the structure of the objective lens actuator is omitted because it is known.

The cylinder lens 110 introduces an astigmatic aberration operation to the laser beams having different wavelength. The cylinder lens 110 is formed by bonding a plurality of lenses whose Abbe numbers and curvatures (spherical surfaces) are adjusted such that an achromatic effect can be realized for each of the laser beams having the different wavelengths.

The photo detector 111 has sensor patterns for deriving a reproduction RF signal, a focus error signal, and a tracking error signal from an intensity distribution of received laser beams. A signal from each of the sensor patterns is outputted to the reproduction circuit and the servo circuit, which are provided on the disc apparatus side. In this embodiment, an astigmatic aberration method is adopted as a focus error signal production method, and DPP (Differential Push Pull) method is adopted as a tracking error signal production method. A sensor pattern of the photo detector 111 and an error signal production using signals form the sensor will be explained in detail later.

Figure 2A:
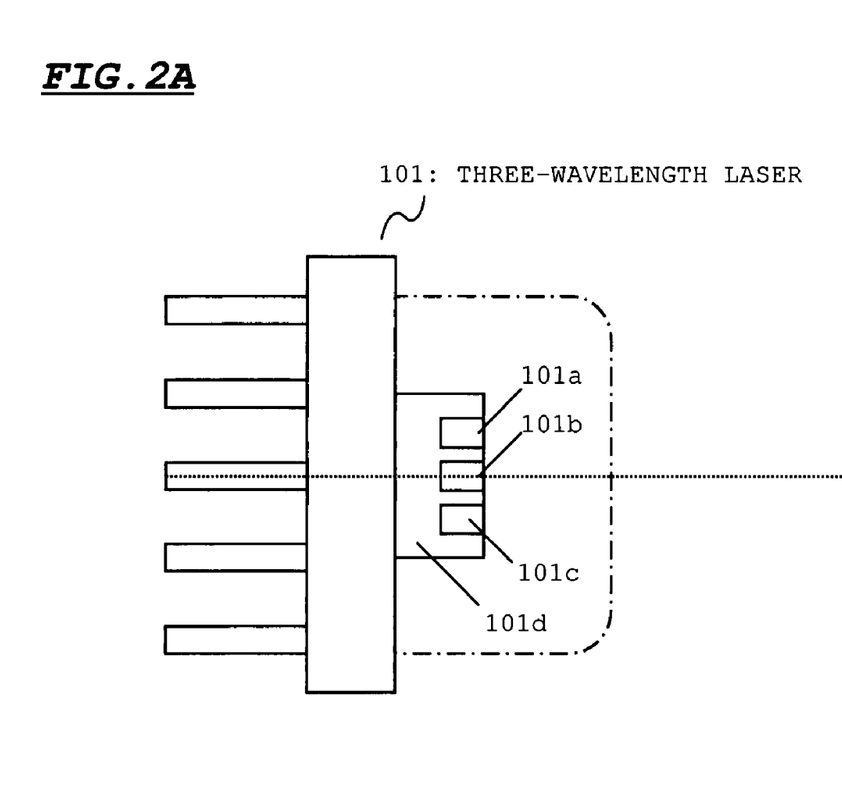
FIGS. 2A and 2B show a structure of a three-wavelength laser according to the embodiment.
Figure 2B:
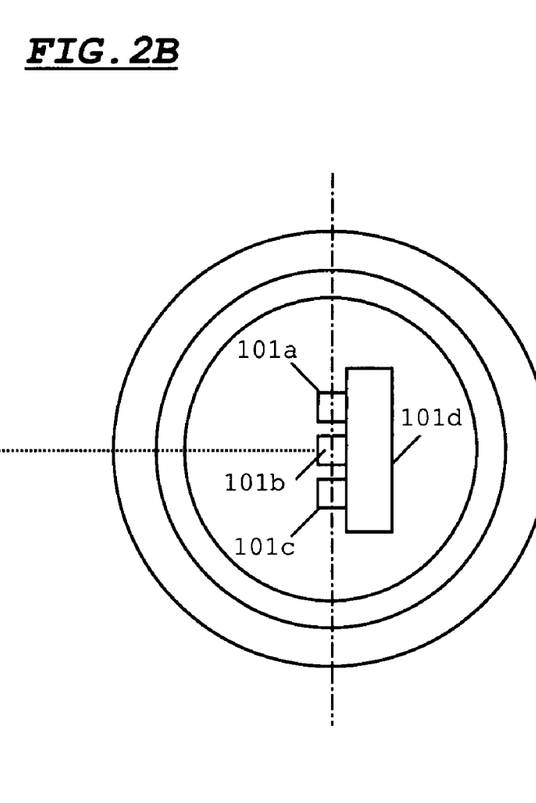

FIGS. 2A and 2B show a structure of the three-wavelength laser 101. FIG. 2B is a side view when FIG. 2A is viewed from the right side.

In FIGS. 2A and 2B, references 101a to 101c denote laser elements. As shown in FIGS. 2A and 2B, the laser elements 101a to 101c are mounted on a base 101d to be aligned on a straight line as viewed from the beam window side. A gap between the respective laser elements is such gap that the laser beams emitted from the laser element 101c (650 nm in wavelength) is diffracted by the optical axis correction element 103 such that the optical axis thereof is aligned with the optical axis of the laser beam emitted from the laser element 101a (450 nm in wavelength).

Figure 3:
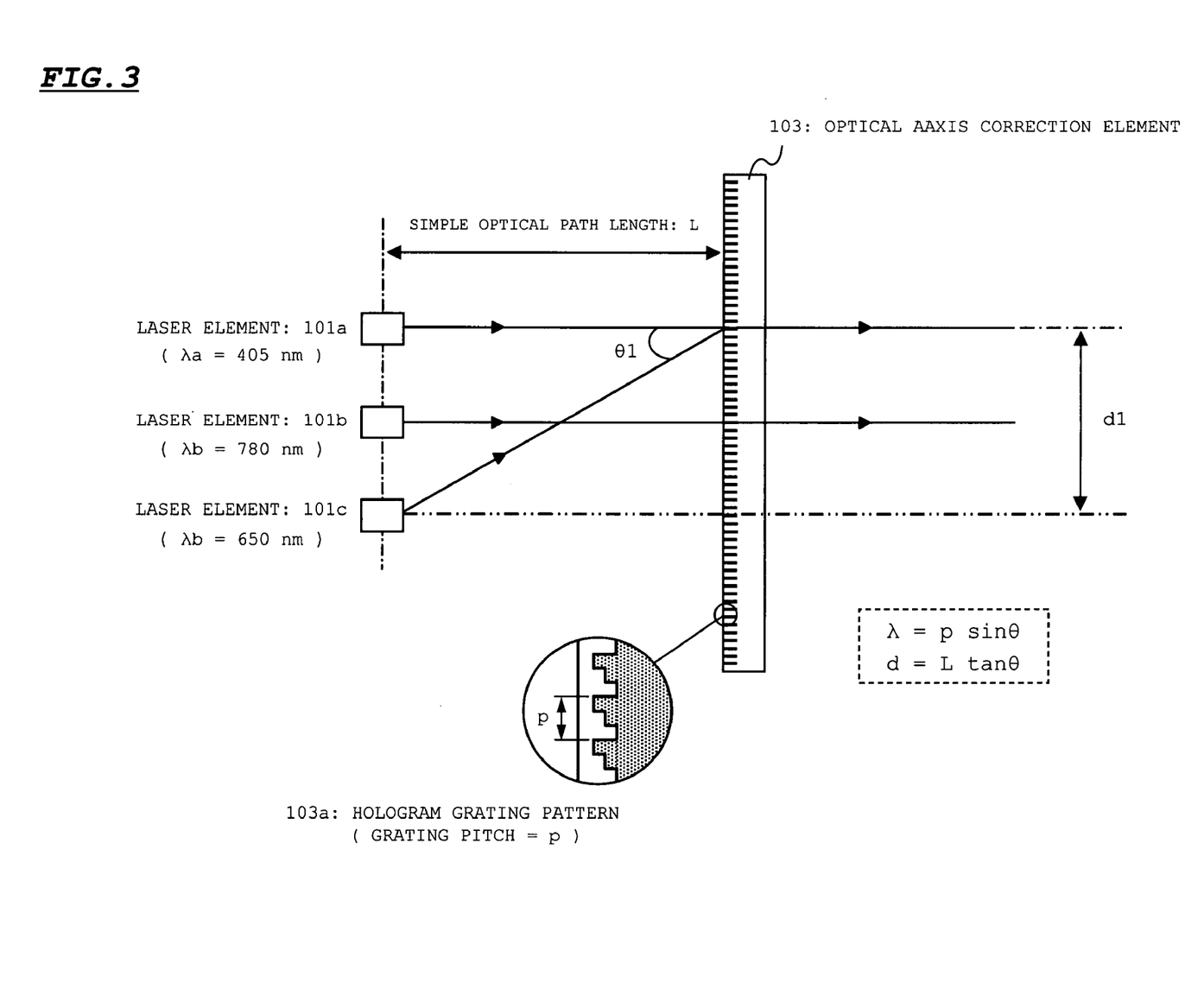
FIG. 3 is an explanatory view showing action made by an optical axis correction element according to the embodiment.

FIG. 3 shows a relationship between the laser elements 101a to 101c and the optical axis correction element.

As shown in FIG. 3, a hologram grating pattern 103a is formed on the surface on a laser beam incident side of the diffraction grating. FIG. 3 shows a grating pattern in which the number of steps is 3.

When a grating pitch is given by p, a relationship between a diffraction angle θ of first order diffraction light of a laser beam and a wavelength λ thereof is expressed by the following expressions:

$$\lambda = P \sin \theta \quad (1)$$

$$\theta = \sin^{-1} \lambda/p \quad (2)$$

Therefore, when the optical axis of the laser beam from the laser element 101c is to be aligned with the optical axis of the laser beam from the laser element 101a by the diffracting action of the optical axis correction element 103, light emitting point gap d1 is expressed by the following expression:

$$d1 = L \tan \theta 1 \quad (3)$$

Thus, the light emitting point gap d1 is set as follows based on the wavelength λc of the laser beam from the laser element 101c and the grating pitch p of the optical axis correction element 103:

$$d1 = L \tan(\sin^{-1} \lambda c/p) \quad (4)$$

A simple optical path length L is obtained by substituting the wavelength λc of the laser beam from the laser element 101c and the light emitting point gap d1 to the above expression. By setting the optical axis correction element 103 at the position where the distance from the emitting point of the laser element 101a is to be the simple optical path L obtained above, the optical axis of the laser beam (first-order diffraction light) from the laser element 101c is aligned with the optical axis of the laser beam from the laser element 101a.

Figure 4A:
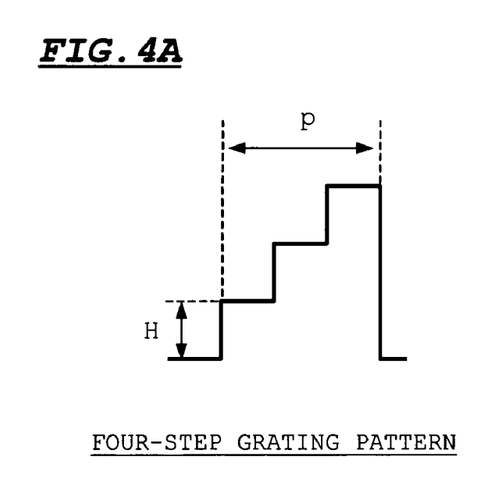
FIG. 4A, 4B and 4C are example of grating pattern and diffraction efficiency of an optical axis correction element according to the embodiment.
Figure 4B:
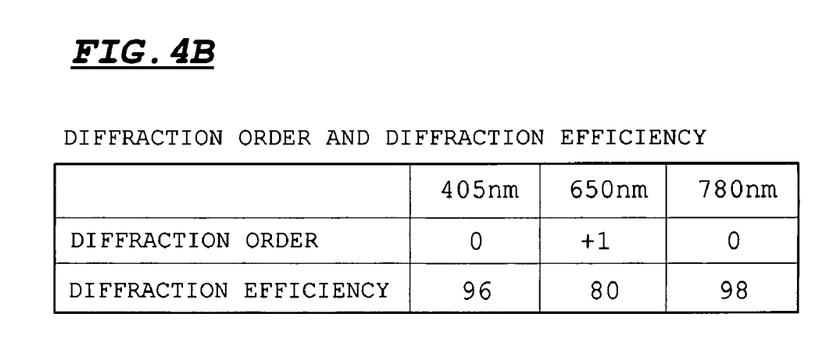
Figure 4C:
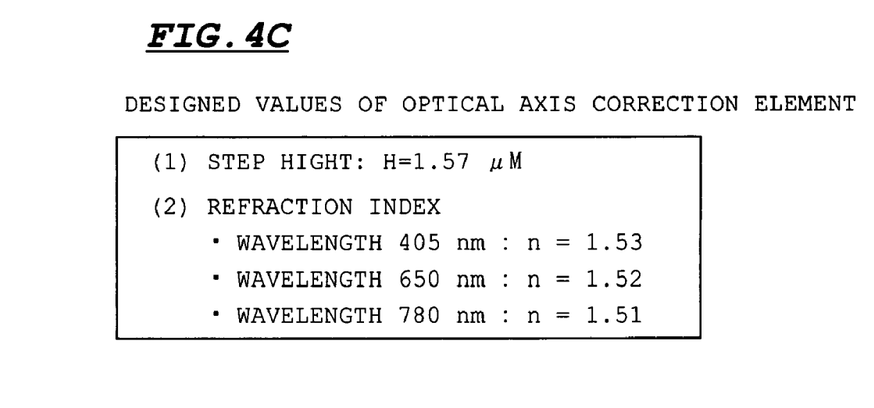

FIGS. 4A, 4B and 4C show a design example of a grating pattern and a result of a simulation for diffraction efficiency with respect to a diffraction grating formed under the design example.

By forming the grating pattern as shown in FIGS. 4A (the number of steps is 4) on the surface of the diffraction grating and setting the design condition of the grating pattern as shown in FIG. 4C, the diffraction efficiency with respect to each of the laser beams having different wavelength may be set a value shown in FIG. 4B. That is, according to this design example, diffraction efficiency of first-order diffraction light of the laser beam for DVD (650 nm in wavelength) subjected to the optical axis correction is to be 80% while diffraction efficiency of zero-order diffraction light of the laser beams for next-generation DVD (405 nm in wavelength) and CD (780 nm in wavelength) are to be 96% and 98% respectively.

In this embodiment, the optical axis of the laser beam for DVD (650 nm in wavelength) is align with the optical axis of the laser beam for next-generation DVD (405 nm in wavelength) through the optical axis correction element 103. And the optical axis of the laser beam for DVD is kept to be aligned with the optical axis of the laser beam for next-generation DVD during the light path from the optical axis correction element 103 to the photo detector 111. On the other hand, the optical axis of the laser beam for CD (780 nm in wavelength) is kept to be deviated from the optical axis of the laser beam for next-generation DVD (405 nm in wavelength) during the whole light path from the three-wavelength laser 101 to the photo detector 111. Therefore, the laser beam for CD is incident on the photo detector 111 with deviation from two of other laser beams.

Figure 6A:
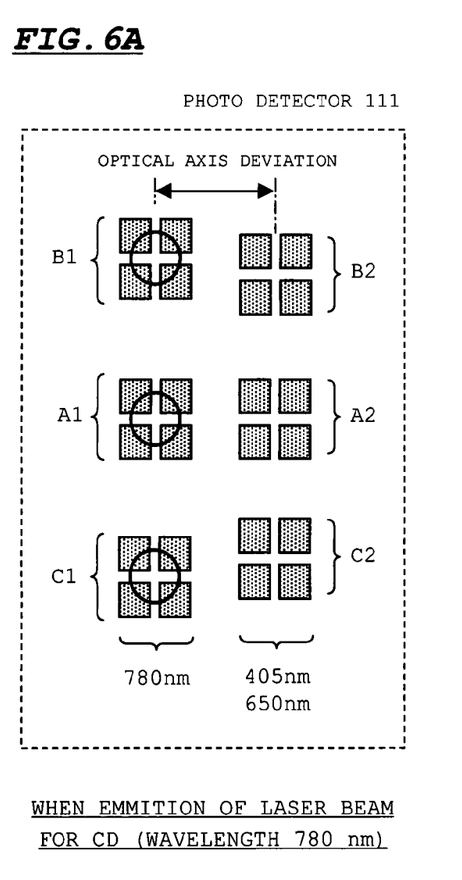
FIGS. 6A, 6B and 6C show a relation between beam spots and photo detectors according to the embodiment.
Figure 6B:
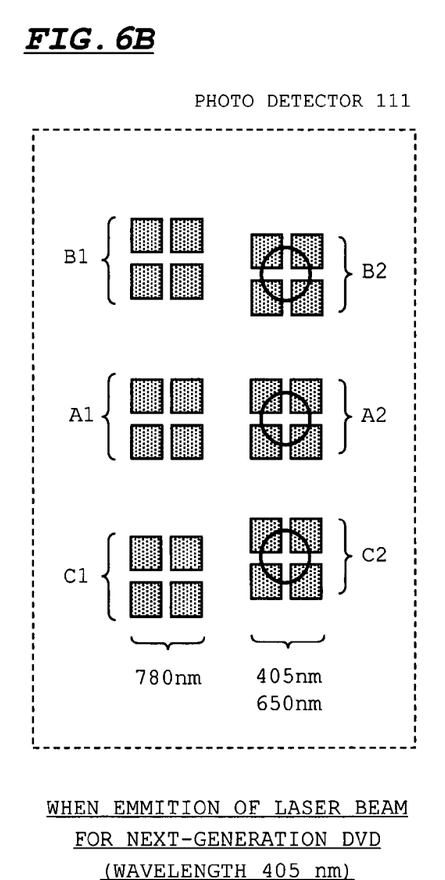
Figure 6C:
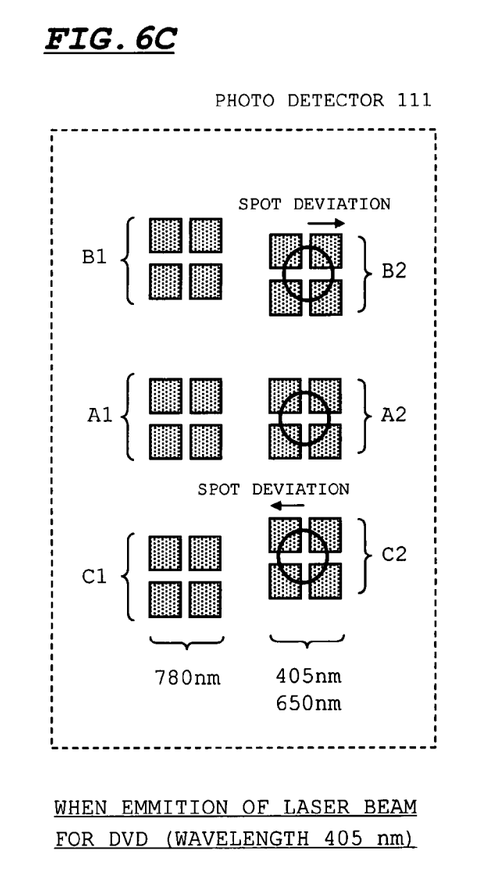

FIGS. 6A, 6B and 6C show a sensor pattern of the photo detector 111 and a state of beam spots focused thereon (on-focus state).

As shown in FIGS. 6A, 6B and 6C, a set of sensors A1, B1 and C1 receiving the laser beam for CD (780 nm in wavelength) and a set of sensors A2, B2 and C2 receiving the laser beams for DVD (650 nm in wavelength) and next-generation DVD (450 nm in wavelength) are disposed in the photo detector 111. The laser beam of each wavelength is divided into three beams of zero-order diffraction light, positive first-order diffraction light and negative first-order diffraction light through the three-beam-use diffraction grating 102. Among them, zero-order diffraction light is received by four-divided sensor A1 or A2, and positive first-order diffraction light and negative first-order diffraction light are received by four-divided sensor B1 or B2 and four-divided sensor C1 or C2 respectively.

The photo detector 111 is deposed such that a deviation direction between the optical axes of the laser beams for next-generation DVD (405 nm in wavelength) and CD (780 nm in wavelength) is to be right and left directions in FIGS. 6A, 6B and 6C. A set of sensors A1, B1 and C1 receiving the laser beam for CD is disposed at the position apart from a set of sensors A2, B2 and C2 receiving the laser beams for next-generation DVD and DVD with a distance corresponding to the deviation amount between the optical axes thereof.

As shown in FIG. 6B, when the laser beam for next-generation DVD is emitted from the three-wavelength laser 101, beam spots of zero-order diffraction light, positive first-order diffraction light and negative first-order diffraction light are positioned on the center of four-divided sensor A2, B2 and C2 respectively.

On the other hand, when the laser beam for DVD is emitted from the three-wavelength laser 101, since the inclination angular α2 is larger than the inclination angular α1 as shown in FIGS. 5A and 5B, beam spots of positive first-order diffraction light and negative first-order diffraction light are, as shown in FIG. 6C, disposed on the position deviated from the center of four-divided sensor B2 and C2 at the inclination direction respectively. Even occurring the deviation, however, a tracking error signal explained later is produced without harm since the deviation amount on the sensor is several micro meter. Therefore, when the adjustment of the grating pitch and the disposition is made with respect to the diffraction gratings for next-generation DVD and DVD among of the gratings of the three-beam-use diffraction grating 102 descried above such that the beam spots are disposed on the disc with the condition shown in FIGS. 5A and 5B, it is possible that both of the laser beams for next-generation DVD and DVD are received properly by a set of sensor patterns A2, B2 and C2.

Figure 7:
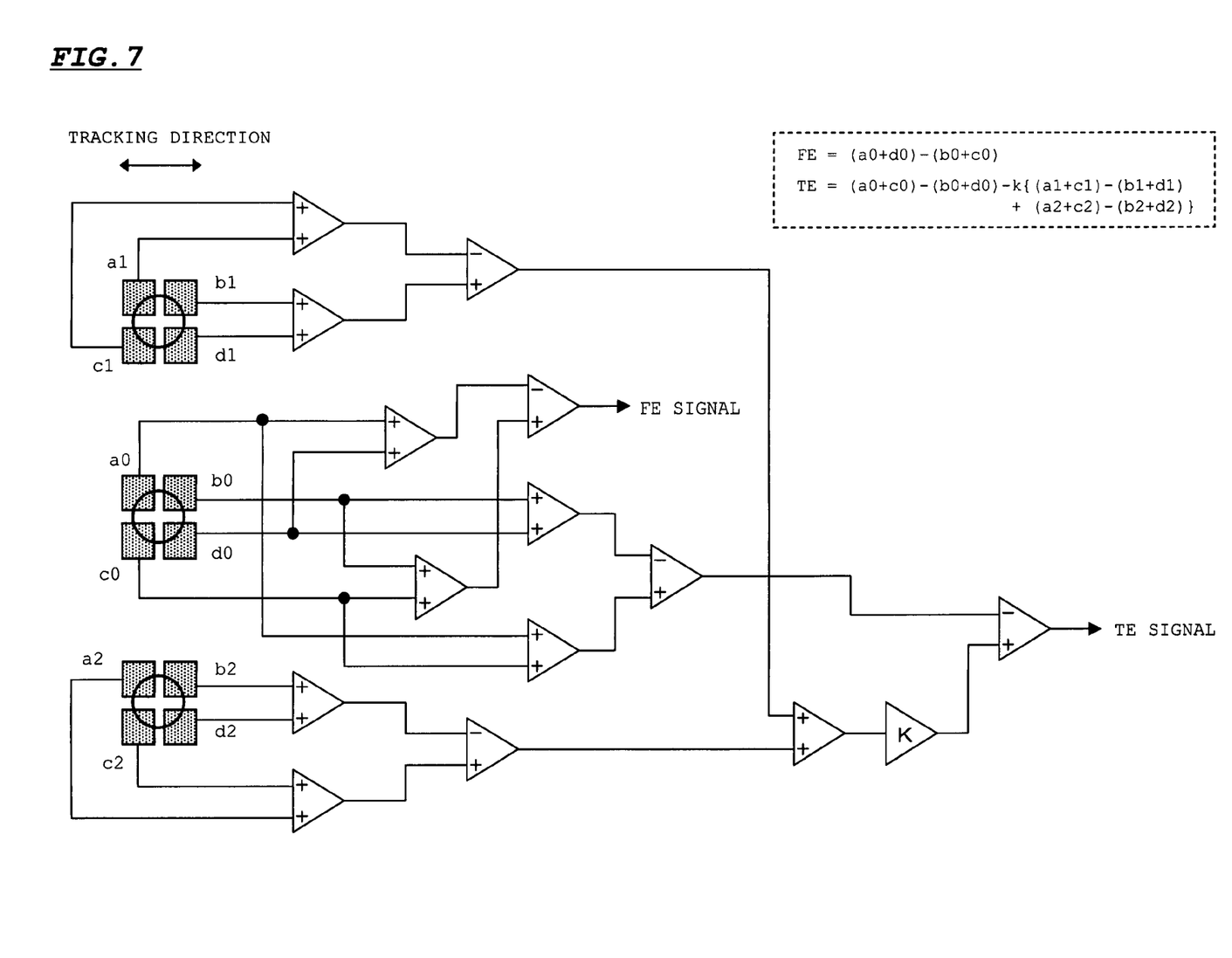
FIG. 7 shows a calculation circuit for focus error signal and tracking error signal according to the embodiment.

FIG. 7 shows a calculation circuit for producing a focus error signal and a tracking error signal from detection signals output from the photo detector 111.

It is noted that FIG. 7 shows only a calculation circuit with respect to the set of sensors for next-generation DVD and DVD (four-divided sensors A2, B2 and C2). In FIG. 7, output signals from sensors constituting the four-divided sensors A2, B2 and C2 are denoted with symbols a0 to d0, a1 to d1, and a2 to d2. It is noted that a calculation circuit with respect to the set of sensors for CD (four-divided sensors A1, B1 and C1) is formed by the same configuration as FIG. 7 to produce the focus error signal and the tracking error signal for CD.

As shown in FIG. 7, the focus error signal (FE) is produced by the calculation of FE=(a0+d0)−(b0+c0). Also, the tracking error signal (TE) is produced by the calculation of TE=(a0+c0)−(b0+d0)−k {(a1+c1)−(b1+d1)+(a2+c2)−(b2+d2)}. Hence, k is a multiplying factor depending on the difference between light powers of zero-order diffraction light and first-order diffraction light.

According to this embodiment, only the optical axis of the laser beam for DVD between the laser beams for DVD and CD is align with the optical axis of the laser beam for next-generation DVD. Thus, a decrease of laser power under diffraction efficiency is occur through a sole of the optical axis correction element 103 only one time. Therefore, a decrease of laser power with respect to the laser beams having respective wavelengths is suppressed in comparison with the case that both of the optical axes of the laser beams for DVD and CD are aligned to the optical axis of the laser beam for next-generation DVD through two of the optical axis correction elements.

In addition, by conducting the optical axis correction with respect not to the laser beam for CD but to the laser beam for DVD, an amount of aberration of laser beams on the disc is suppressed effectively. That is, the amount of aberration (coma aberration, spherical aberration) of laser beams on the disc is expressed by the following expression.

Coma aberration ∝t×NA$^3$/λ

Spherical aberration ∝t×NA$^4$/λ

Thus, as shown by a standardized value in FIG. 10, the aberration occurring to the laser beam for DVD is considerably greater than the aberration occurring to the laser beam for CD owing to a difference with respect to the numerical aperture (NA) of each of the laser beams incident on the objective lens and a difference with respect to the wavelength each of the laser beams. Therefore, when the optical axis correction is conducted not to the laser beam for CD but to the laser beam for DVD like as the above embodiment, it is possible to suppress the aberration effectively.

Further, according to the embodiment, since each of the laser elements is disposed such that the emitting point of the laser beam for CD is to be on the position between the emitting points of the laser beams for next-generation DVD and DVD, it is possible that the position to dispose the laser elements emitting the laser beam for CD is brought close to the position of the laser elements emitting the laser beam for next-generation DVD. Thus, it is possible that the optical axis of the laser beam for CD which is not subjected to the optical axis correction is brought close to the optical axis of the laser beam for next-generation DVD. Therefore, the optical axis deviation amount is suppressed. As the result, it is possible that the aberration amount with respect to the laser beam for CD which occurs according to the optical axis deviation is suppressed.

As described above, according to the embodiment, the occurrence of the aberration on the disc and the decrease of laser power are suppressed as much as possible while using the diffraction grating as the optical axis correction element.

Note that the present invention is not limited to the above embodiment, and various modifications can be made from the embodiment of the present invention.

Figure 8A:
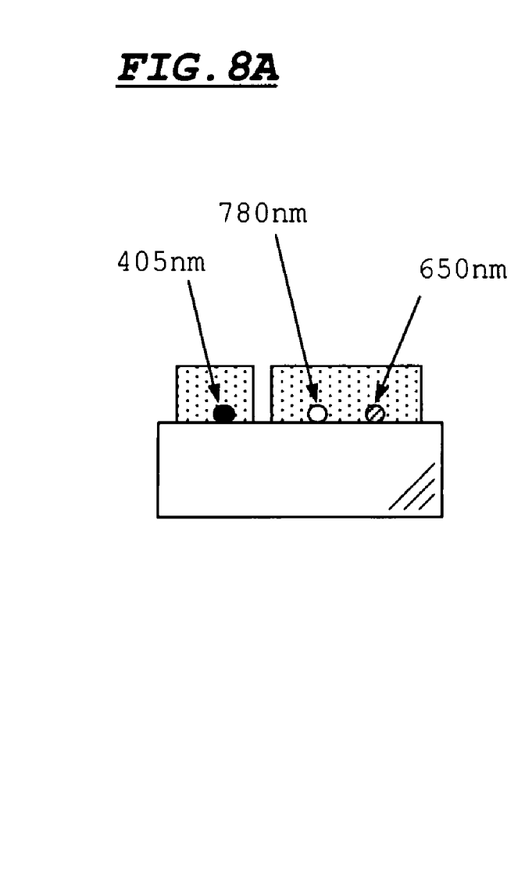
FIGS. 8A, 8B and 8C show other example of structure of a three-wavelength laser according to the embodiment.
Figure 8B:
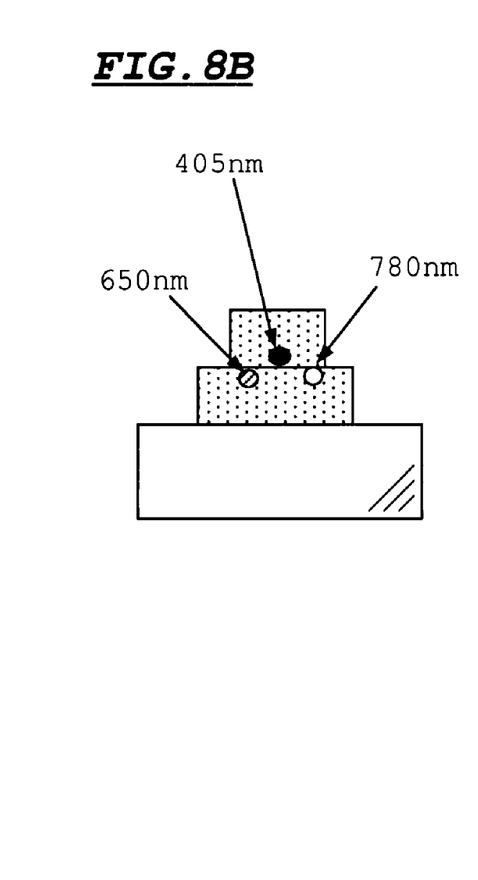
Figure 8C:
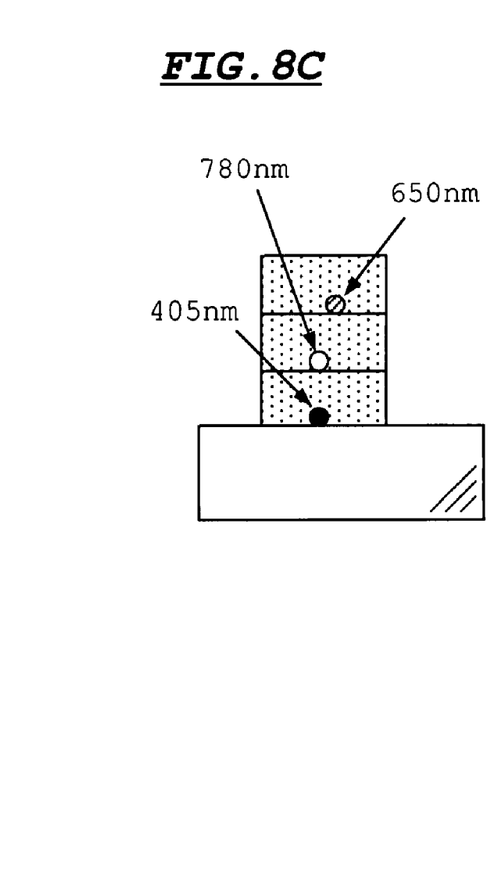
Figure 9A:
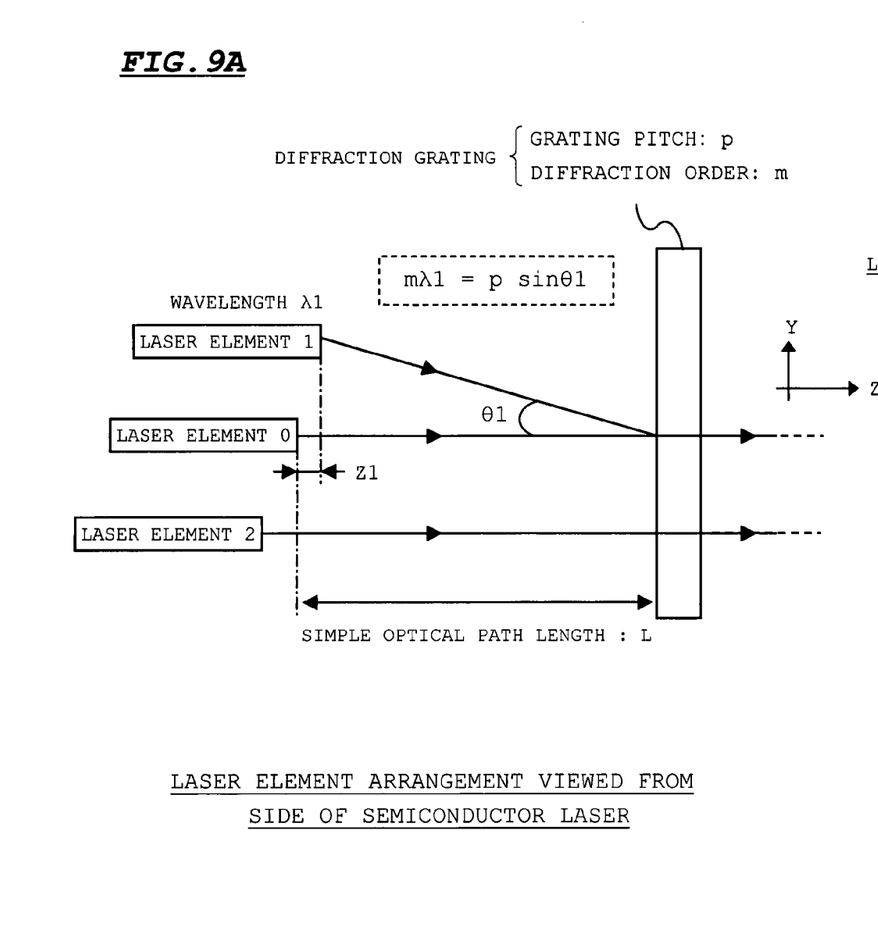
FIGS. 9A and 9B are an explanatory view showing a method of calculation of simple optical length for other example of structure of a three-wavelength laser according to the embodiment.
Figure 9B:
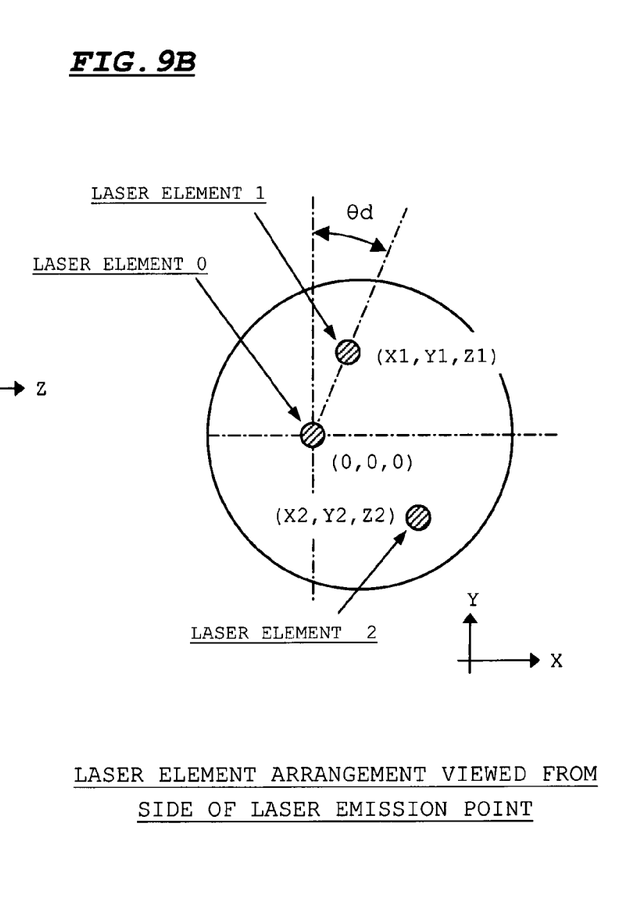

For example, according to the above embodiment, the laser elements are arranged to be aligned on a straight line shown in FIG. 8A. Instead of this, the laser elements may be arranged not to be aligned on a straight line shown in FIGS. 8B and 8C. Also, the laser elements may be arranged to be back and forward on the optical axis shown in FIG. 9A. In this case, when three-dimensional orthogonal coordinates are set like as shown in FIG. 9B, the simple optical path length L from the laser element 0 to diffraction grating is expressed by the following expression to align the optical axis of the laser beam emitted from the laser element 1 with the optical axis of the laser beam emitted from the laser element 0.

$$L = Z1 + \frac{\sqrt{X1^2 + Y1^2}}{\tan(\sin^{-1}(m\lambda/p))} \tag{5}$$

Here, when θ1 is sufficiently small, tan θ1=sin θ1 is obtained, and thus this expression is approximated by the following expression.

$$L = Z1 + \frac{\sqrt{X1^2 + Y1^2}}{m\lambda/p} \tag{6}$$

Therefore, when coordinate values (X1, Y1, Z1) of a laser element 1 and a wavelength 1 are given as designed values of the semiconductor laser, arrangement position of the diffraction grating designed as described above can be accordingly obtained by assigning values to the corresponding parameters of expression (5) or (6). In this case, the arrangement position of the diffraction grating is set to such a position in an in-plane direction that the pitch direction of the diffraction grating conforms to the direction of the incline angle Θd.

Further, in the above embodiment, the optical axis correction element is disposed only on the optical path between the three-wavelength laser 101 and the object lens 109. Adding to this structure, another optical axis correction element to correct the optical axis of the laser beam for CD may be disposed on the optical path between the polarization BS 104 and the photo detector 111. In this case, power of each laser beams is decreased through this additional optical axis correction element, but power of each laser beam against the disc is kept as the same as the case of the above embodiment, and then a characteristic in the data recording and the data reproducing is not harmed.

Further, in the above embodiment, the astigmatic aberration method is adopted as a focus error signal production method, and the DPP (Differential Push Pull) method is adopted as a tracking error signal production method, but these methods are not limit the scope on the present invention. Other method like as a beam size method is capable to be adopted as the method to produce the focus error signal and the tracking error signal with respect to the embodiment of the present invention.

It is possible to make various changes to the embodiments of the present invention as appropriate without departing from the scope of the technical idea described in the appended claims.

What is claimed is:

1. An optical pickup device, comprising: a semiconductor laser that houses three emission elements, respectively emitting reference, first, and second laser beams having different emission wavelengths and optical axes, in a single package; and a diffraction grating for matching by a diffraction effect, the optical axis of the first laser beam with the optical axis of the reference laser beam, wherein a numerical aperture of the first laser beam incident on an objective lens is greater than a numerical aperture of the second laser beam on the objective lens, and the diffraction grating is disposed in an optical path between the semiconductor laser and the objective lens, wherein the three emission elements are housed in the single package such that a distance between the emission element emitting the first laser beam and the emission element emitting the reference laser beam in a direction perpendicular to the optical axis of the reference laser beam is greater than a distance between the emission element emitting the second laser beam and the emission element emitting the reference laser beam in a direction perpendicular to the optical axis of the reference laser beam.

2. An optical pickup device according to claim 1, wherein the three emission elements are arranged as separating each other at one direction and are housed in the single package such that the emission element emitting the remaining second laser beam is disposed between the emission element emitting the first laser beam and the emission element emitting the reference laser beam.

3. An optical pickup device according to any one of claims 2, wherein the emission element emitting the reference laser beam emits a blue-violet laser beam for next-generation DVD, the emission element emitting the first laser beam emits a red laser beam for DVD and the emission element emitting the second laser beam emits a infrared laser beam for CD.

4. An optical pickup device, comprising:
a semiconductor laser that houses three emission elements, respectively emitting reference, first, and second laser beams having different emission wavelengths and optical axes, in a single package;
and a diffraction grating for matching, by a diffraction effect, the optical axis of the first laser beam with the optical axis of the reference laser beam,
wherein the wavelength of the first laser beam is shorter than the wavelength of the second laser beam, and the diffraction grating is disposed in an optical path between the semiconductor laser and an objective lens, wherein the three emission elements are housed in the single package such that a distance between the emission element emitting the first laser beam and the emission element emitting the reference laser beam in a direction perpendicular to the optical axis of the reference laser beam is greater than a distance between the emission element emitting the second laser beam and the emission element emitting the reference laser beam in a direction perpendicular to the optical axis of the reference laser beam.

5. An optical pickup device according to claim 4, wherein the three emission elements are arranged as separating each other at one direction and are housed in the single package such that the emission element emitting the second laser beam is disposed between the emission element emitting the first laser beam and the emission element emitting the reference laser beam.

6. An optical pickup device according to any one of claims 4 to 5, wherein the emission element emitting the reference laser beam emits a blue-violet laser beam for next-generation DVD, the emission element emitting the first laser beam emits a red laser beam for DVD and the emission element emitting the second laser beam emits a infrared laser beam for CD.

7. An optical pickup device according to claim 1, wherein an optical path length L between the emission element for the reference laser beam and the diffraction grating is $L = \tan(\sin^{-1}\lambda p)/d$, wherein $\lambda$ is the wavelength of the first laser beam, p is the pitch of the diffraction grating, and d is the distance between the emission element for the reference laser beam and the emission element for the first laser beam.

8. An optical pickup device according to claim 4, wherein an optical path length L between the emission element for the reference laser beam and the diffraction grating is $L = \tan(\sin^{-1}\lambda p)/d$, wherein $\lambda$ is the wavelength of the first laser beam, p is the pitch of the diffraction grating, and d is the distance between the emission element for the reference laser beam and the emission element for the first laser beam.

* * * * *